Figure 3:
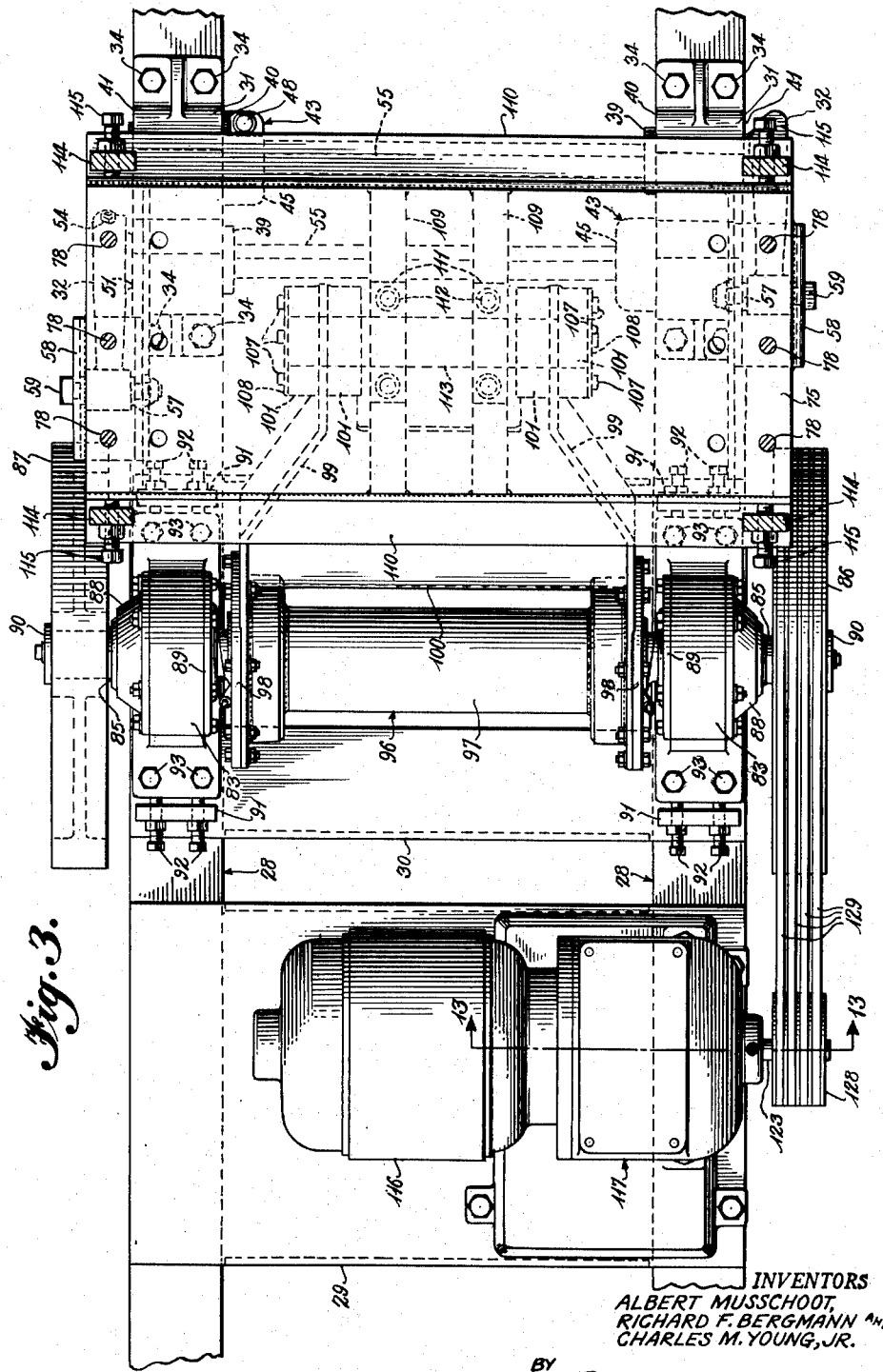

May 12, 1953 A. MUSSCHOOT ET AL 2,638,206
VIBRATORY CONVEYER
Filed Feb. 4, 1949 11 Sheets-Sheet 1
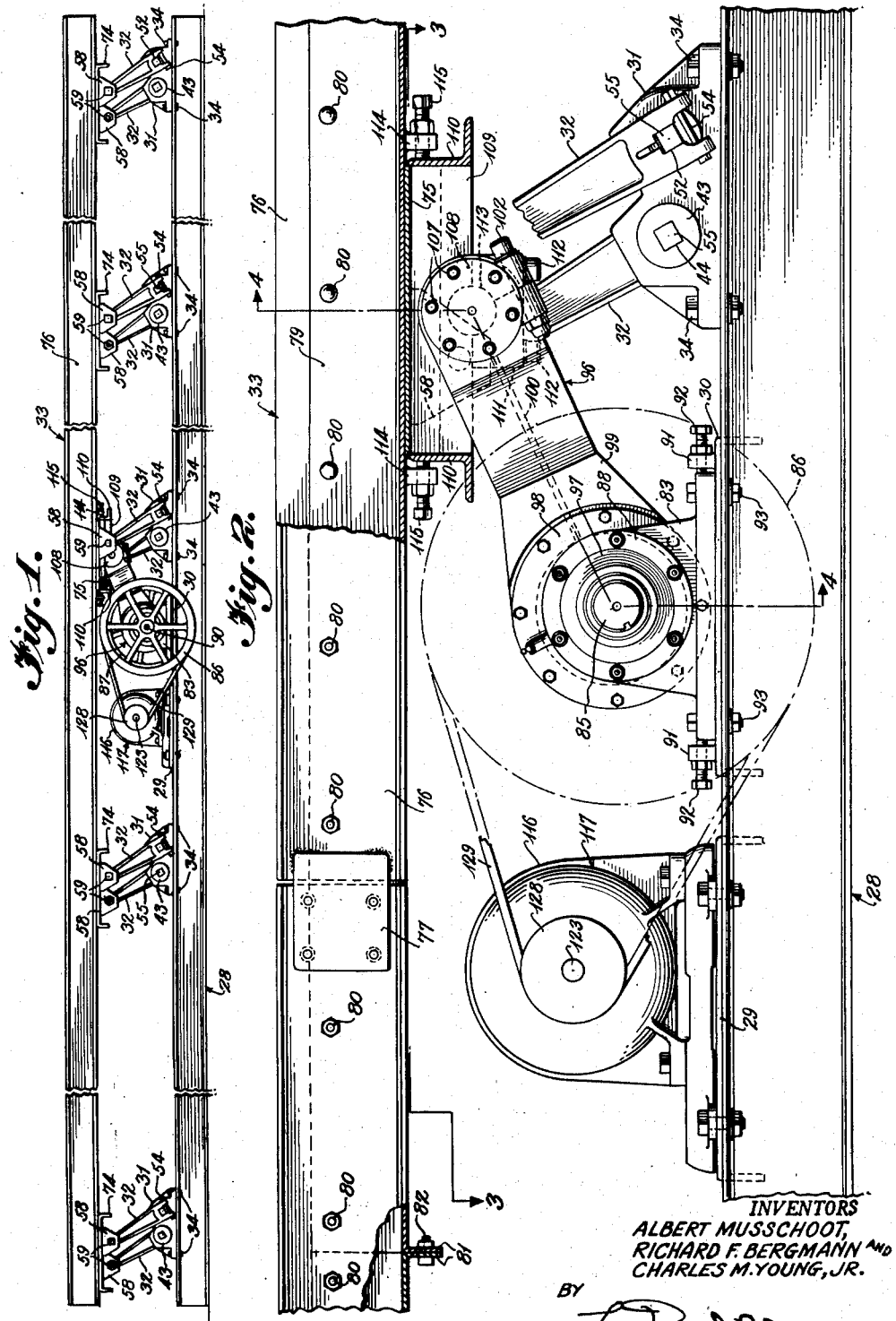
INVENTORS
ALBERT MUSSCHOOT,
RICHARD F. BERGMANN AND
CHARLES M. YOUNG, JR.
BY
ATTORNEY May 12, 1953 A. MUSSCHOOT ET AL 2,638,206
VIBRATORY CONVEYER
Filed Feb. 4, 1949 11 Sheets-Sheet 2

INVENTORS
ALBERT MUSSCHOOT,
RICHARD F. BERGMANN AND
CHARLES M. YOUNG, JR.
BY
ATTORNEY

INVENTORS
ALBERT MUSSCHOOT,
RICHARD F. BERGMANN AND
CHARLES M. YOUNG, JR.
BY
ATTORNEY

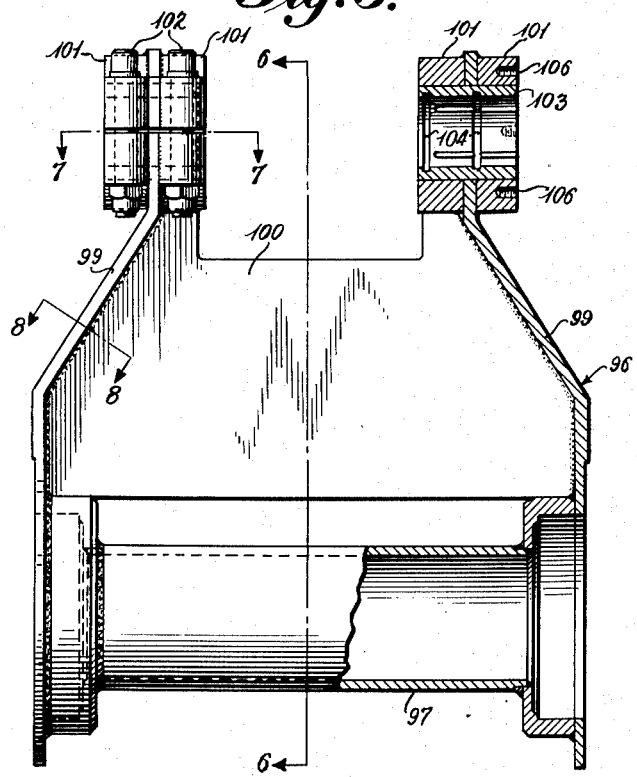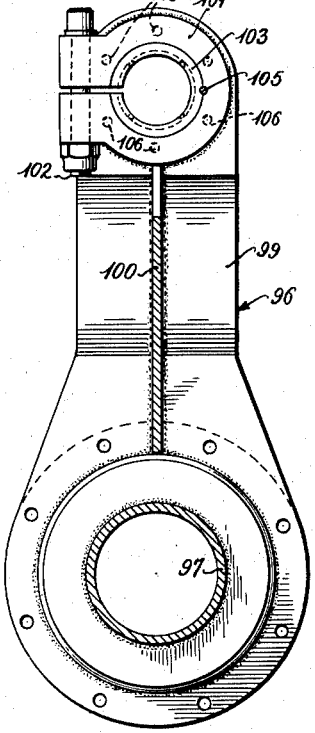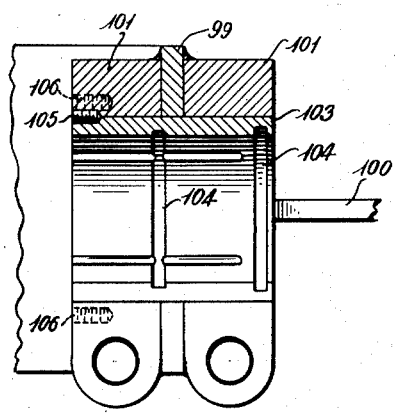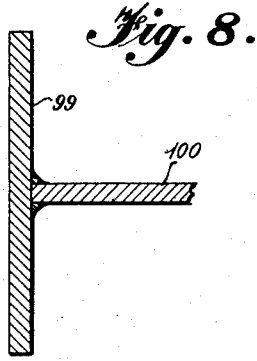

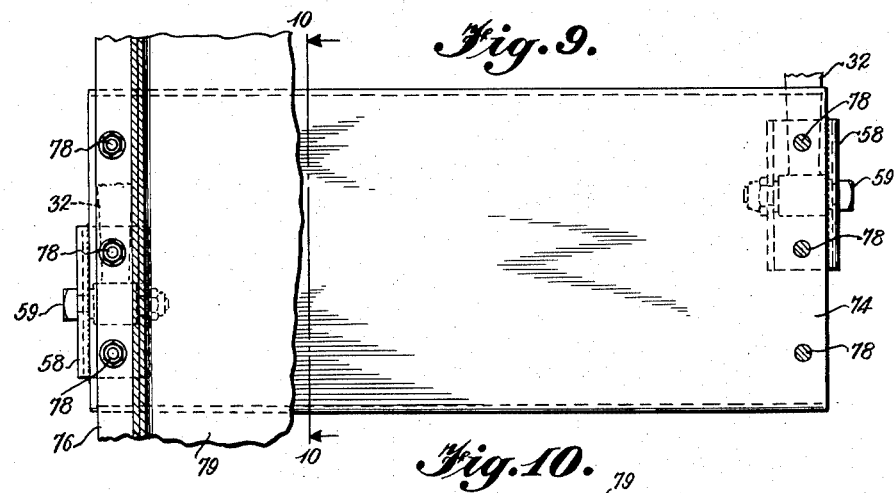
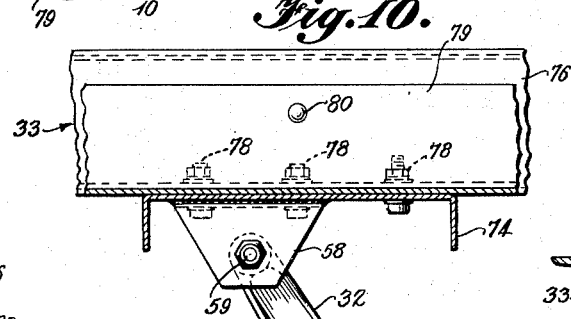
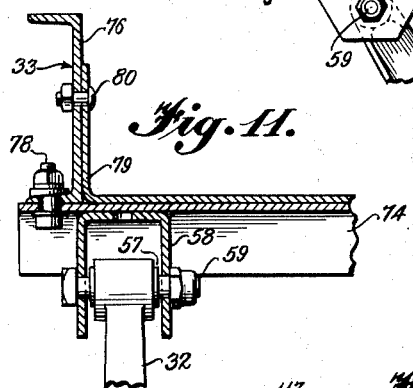
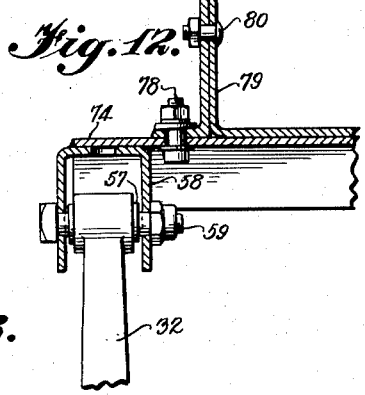
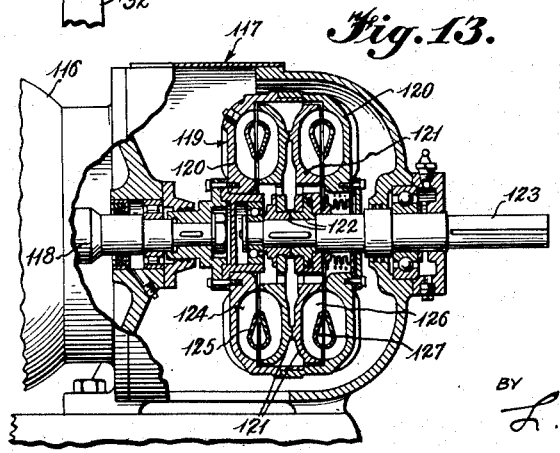

May 12, 1953  A. MUSSCHOOT ET AL  2,638,206
VIBRATORY CONVEYER
Filed Feb. 4, 1949  11 Sheets-Sheet 6
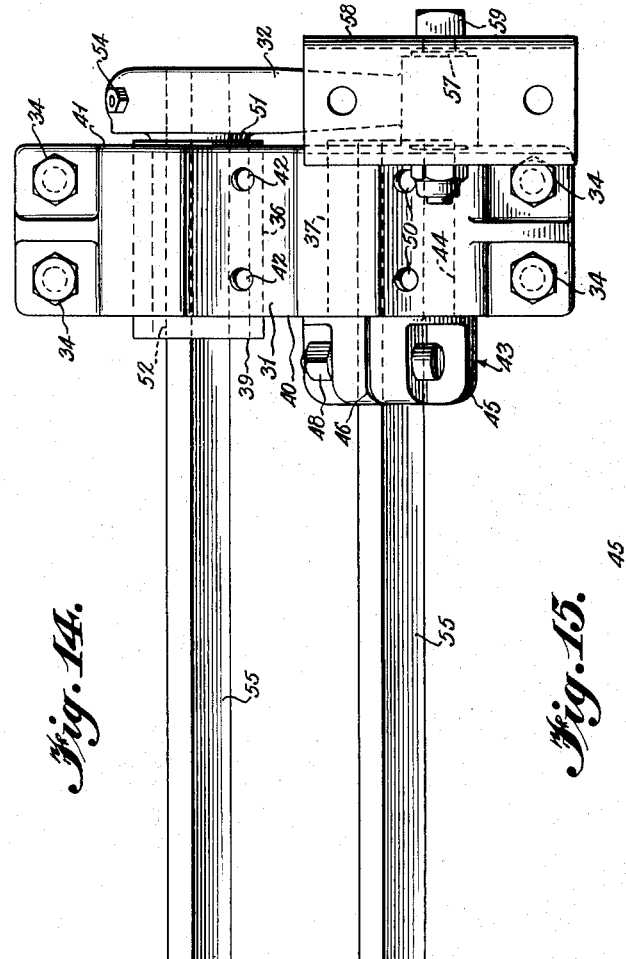
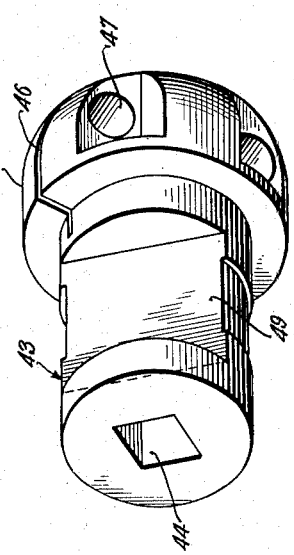
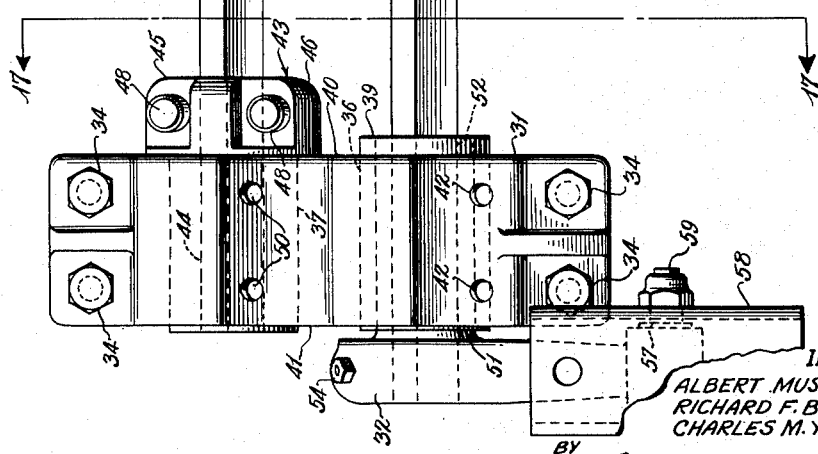
INVENTORS
ALBERT MUSSCHOOT,
RICHARD F. BERGMANN AND
CHARLES M. YOUNG, JR.
BY
ATTORNEY INVENTORS
ALBERT MUSSCHOOT,
RICHARD F. BERGMANN AND
CHARLES M. YOUNG, JR.
ATTORNEY INVENTORS
ALBERT MUSSCHOOT,
RICHARD F. BERGMANN AND
CHARLES M. YOUNG, JR.
BY
ATTORNEY May 12, 1953
A. MUSSCHOOT ET AL
2,638,206
VIBRATORY CONVEYER
Filed Feb. 4, 1949
11 Sheets-Sheet 9
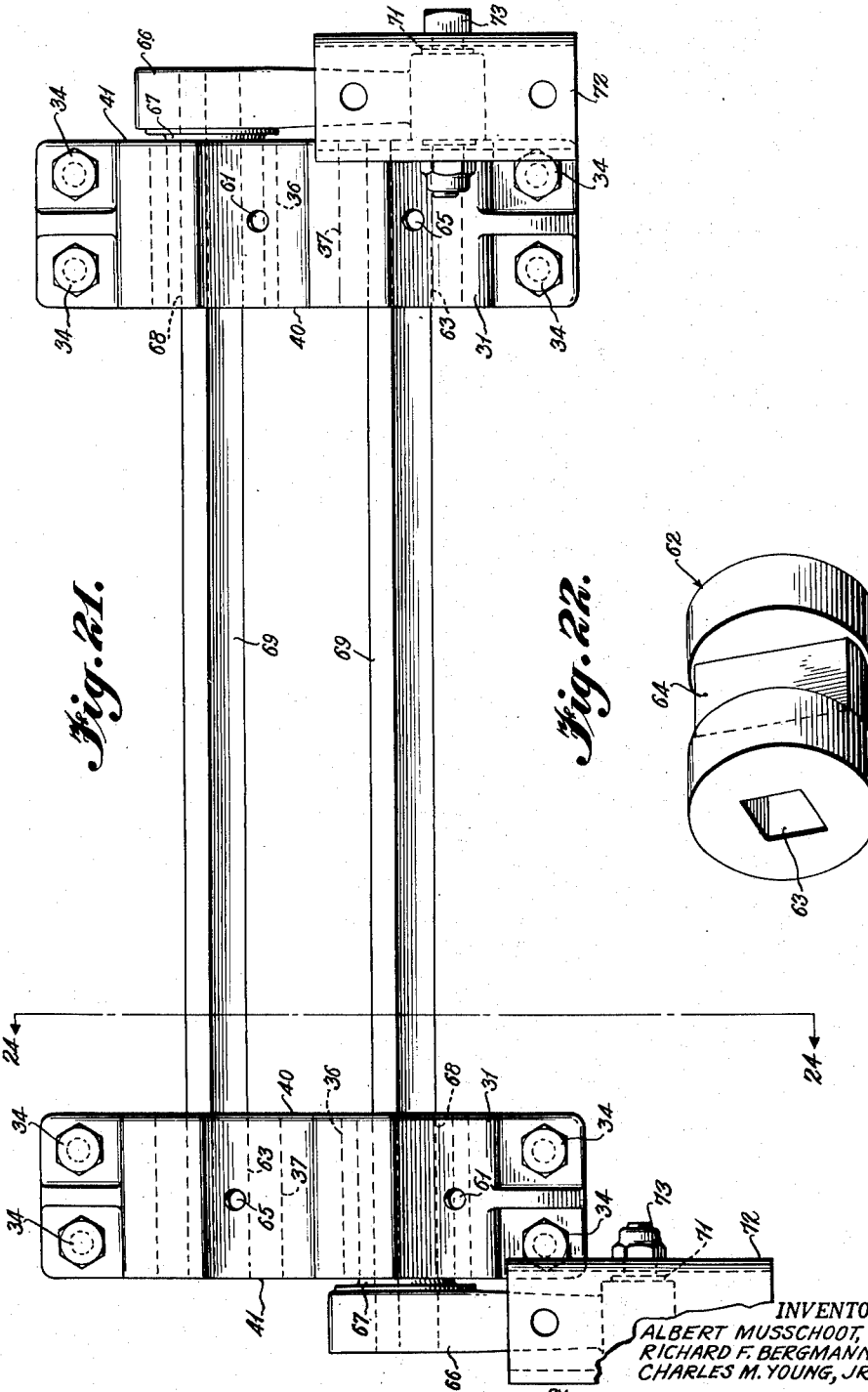
INVENTORS
ALBERT MUSSCHOOT,
RICHARD F. BERGMANN AND
CHARLES M. YOUNG, JR.
BY
ATTORNEY

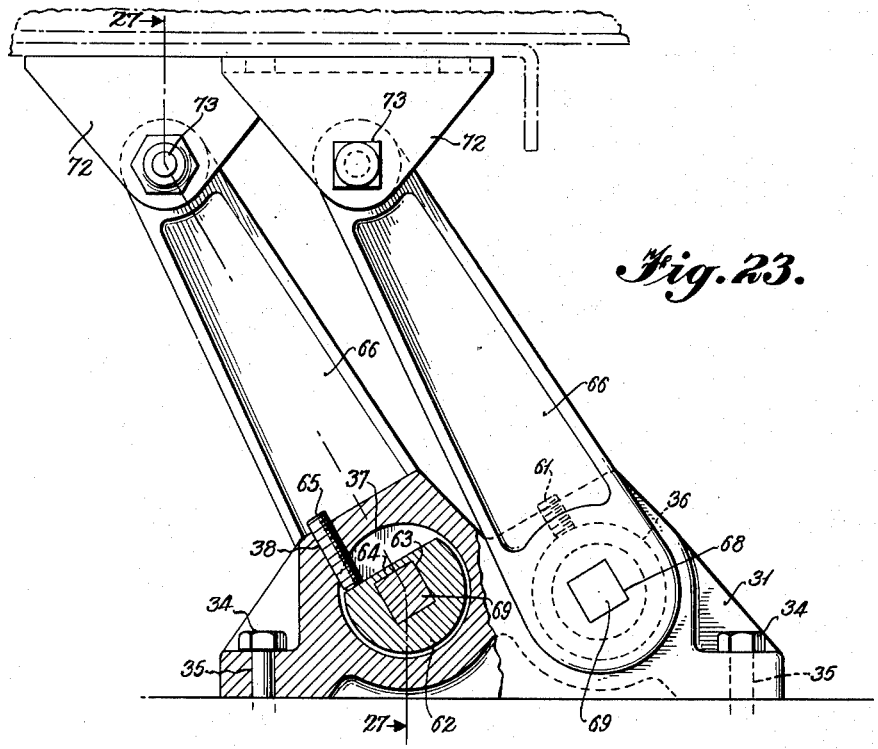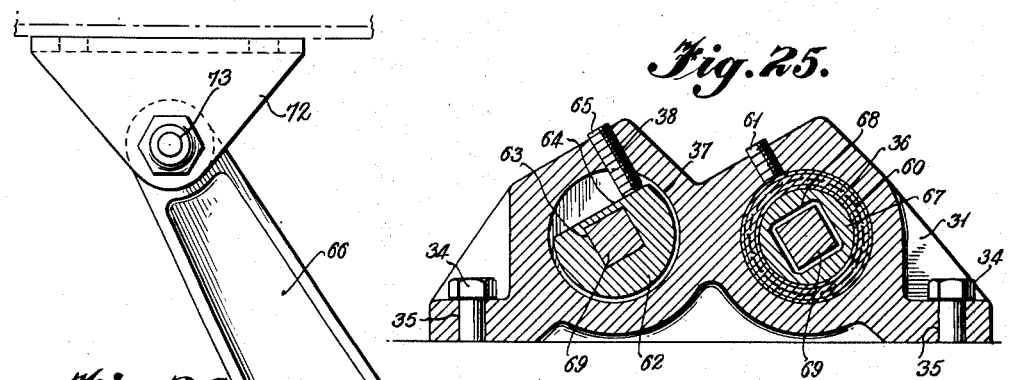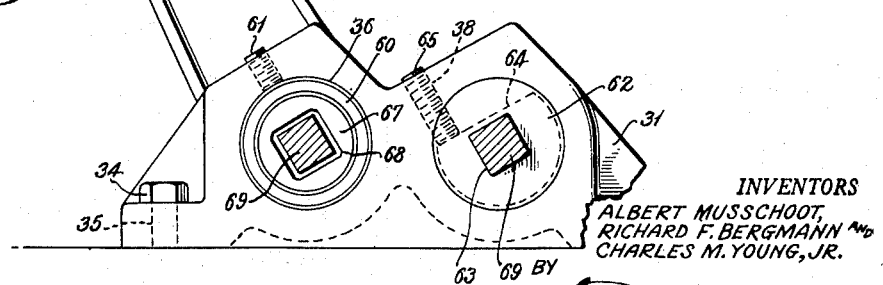

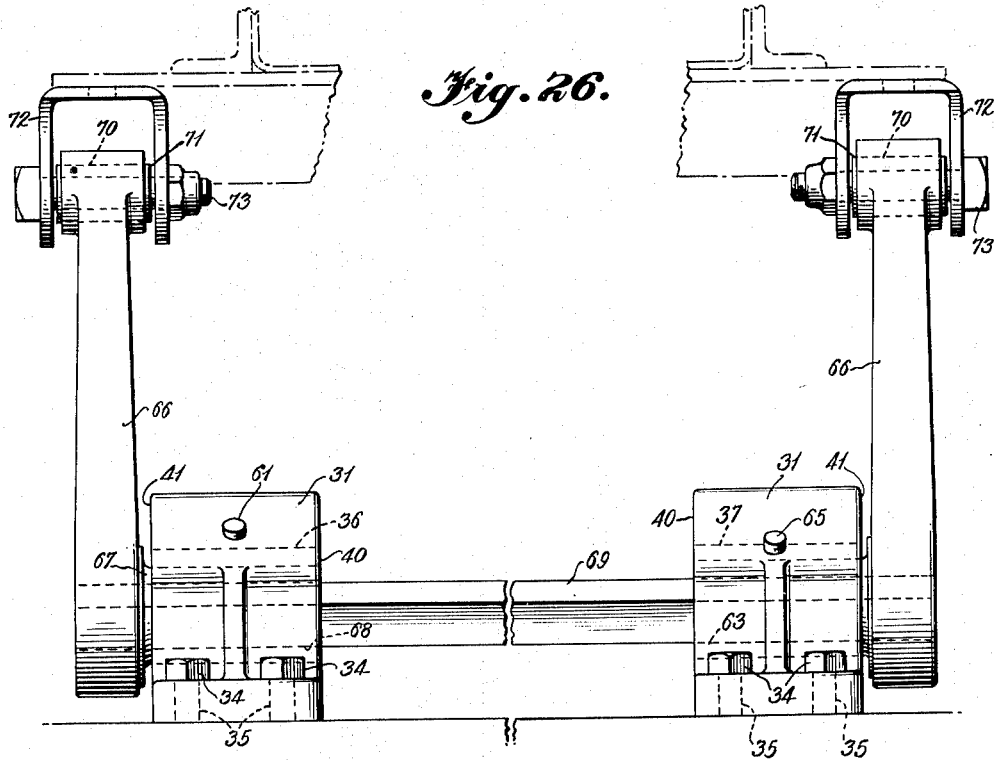
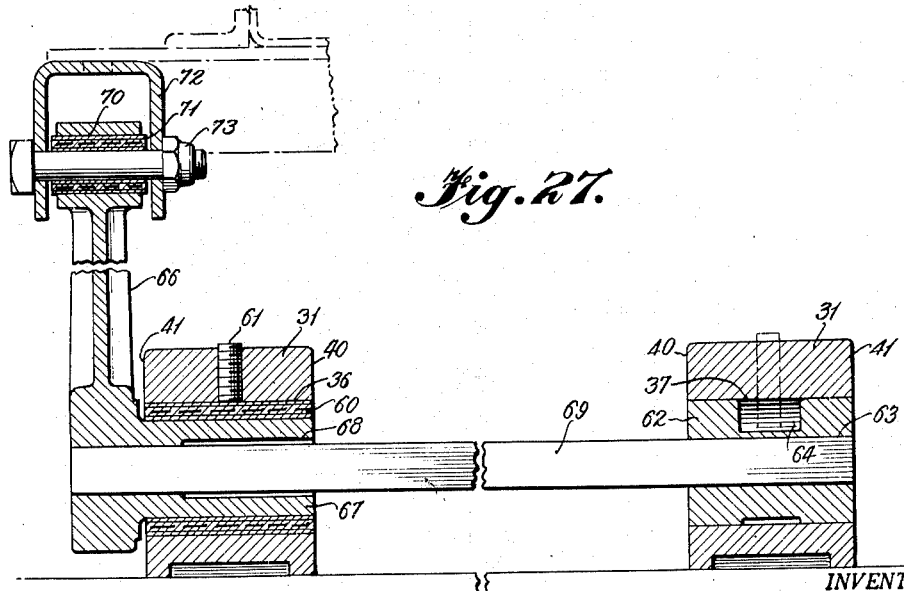

Patented May 12, 1953

2,638,206

UNITED STATES PATENT OFFICE 2,638,206

VIBRATORY CONVEYER

Albert Musschoot, Park Ridge, and Richard F. Bergmann, Winnetka, Ill., and Charles M. Young, Jr., Philadelphia, Pa., assignors to Link-Belt Company, a corporation of Illinois Application February 4, 1949, Serial No. 74,504

20 Claims. (Cl. 198—220)

This invention relates to new and useful improvements in oscillating conveyors, feeders and screens, and more specifically to the driving and supporting mechanism for devices of this type.

It has been found in present practice that the frequency of vibration and length of stroke desirable in oscillating devices for conveying, feeding or screening materials are such that the driving and supporting mechanisms for such devices cannot practically meet the required standards for satisfactory performance. The shock of overcoming the inertia forces of the oscillating body is too great for the driving unit to withstand in any but the relatively small capacity units, and the supporting mechanisms designed to minimize the inertia forces are difficult to install and adjust and are subject to early fatigue failures.

It is the object of this invention to provide an oscillating conveyor, feeder, or the like, incorporating reactor elements capable of imparting a reciprocating force to the vibrating mass that is approximately equal to the sum of the forces of inertia and gravity on the mass.

A further object of the invention is to provide a drive mechanism for an oscillating conveyor, feeder, or the like, that will absorb the shock or impact stresses developed by the inertia forces in the vibrating mass.

A further important object of the invention is to provide a drive mechanism for an oscillating conveyor, feeder, or the like, that will gradually apply the torque necessary to overcome the starting inertia of the mass which is to be vibrated.

A further object of the invention is to provide an integral drive arm for an oscillating conveyor, feeder, or the like, having multiple bearing surfaces for connection to its associated members.

A further object of the invention is to provide an oscillating conveyor, feeder, or the like, that is simple and durable in construction, and economical and efficient in operation.

A still further object of the invention is to provide an oscillating conveyor, feeder, or the like, that can be easily assembled and adjusted in the field.

Other objects and advantages of the invention will be apparent during the course of the following description.

Figure 4:
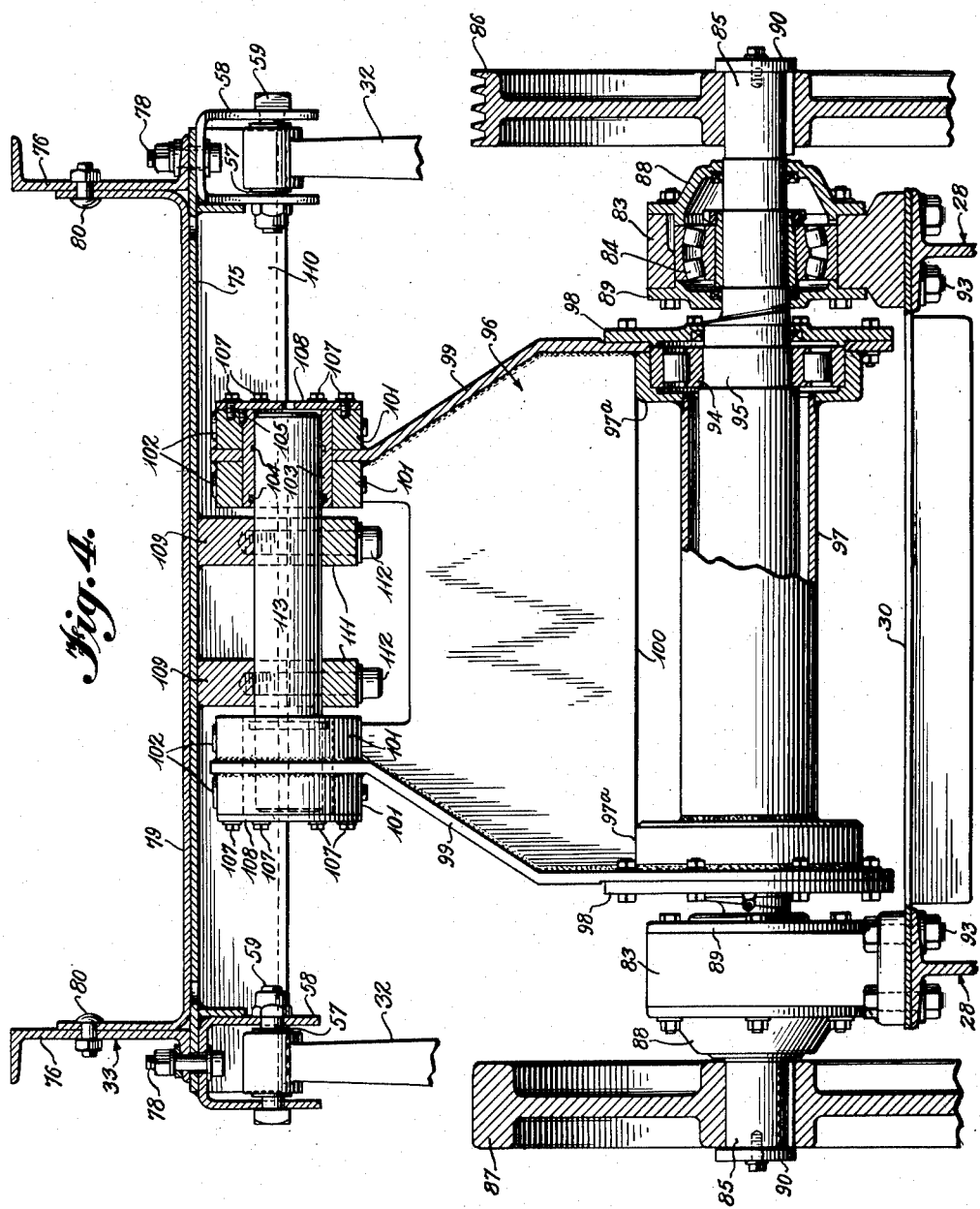
Figure 16:
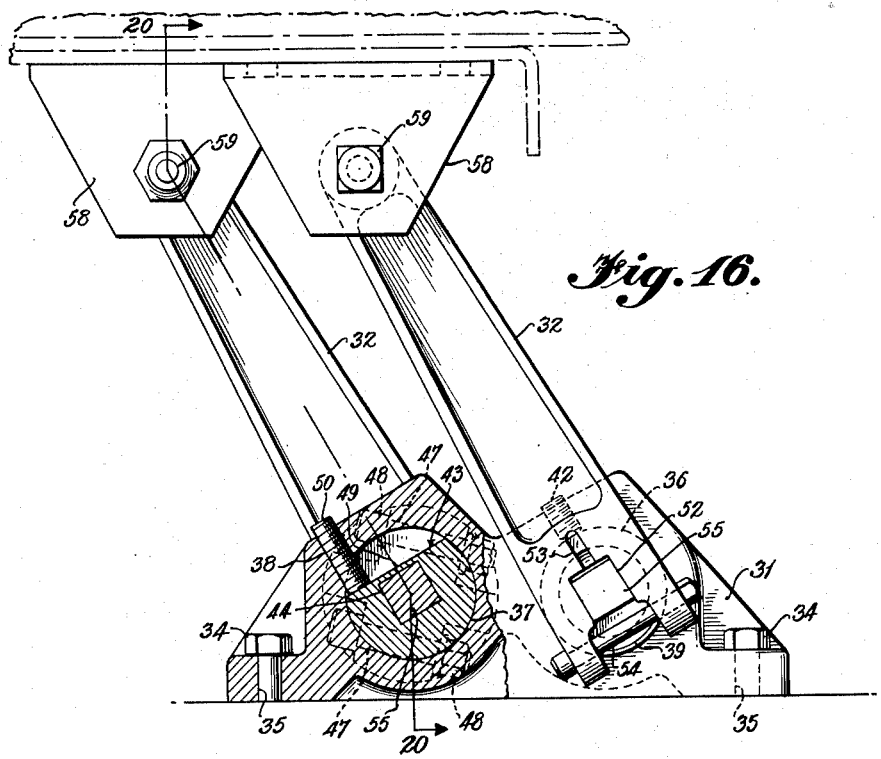
Figure 18:
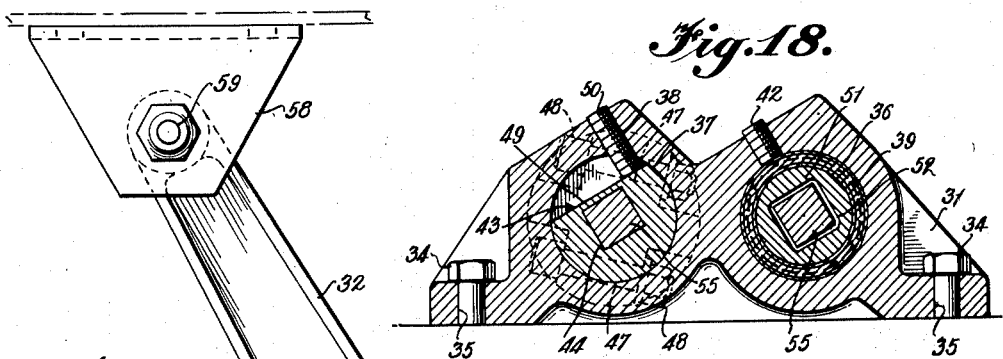
Figure 17:
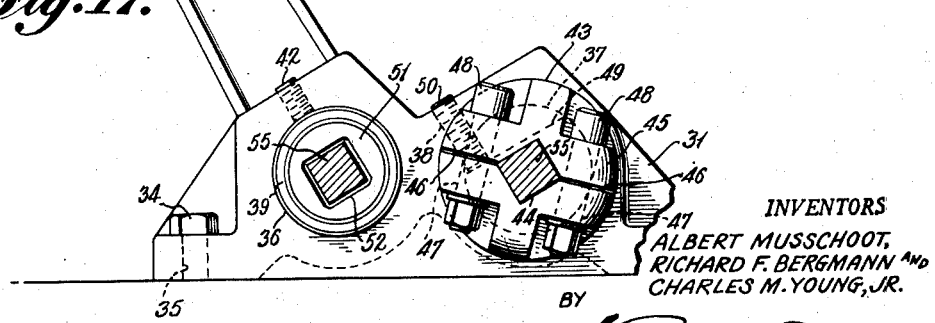
Figure 19:
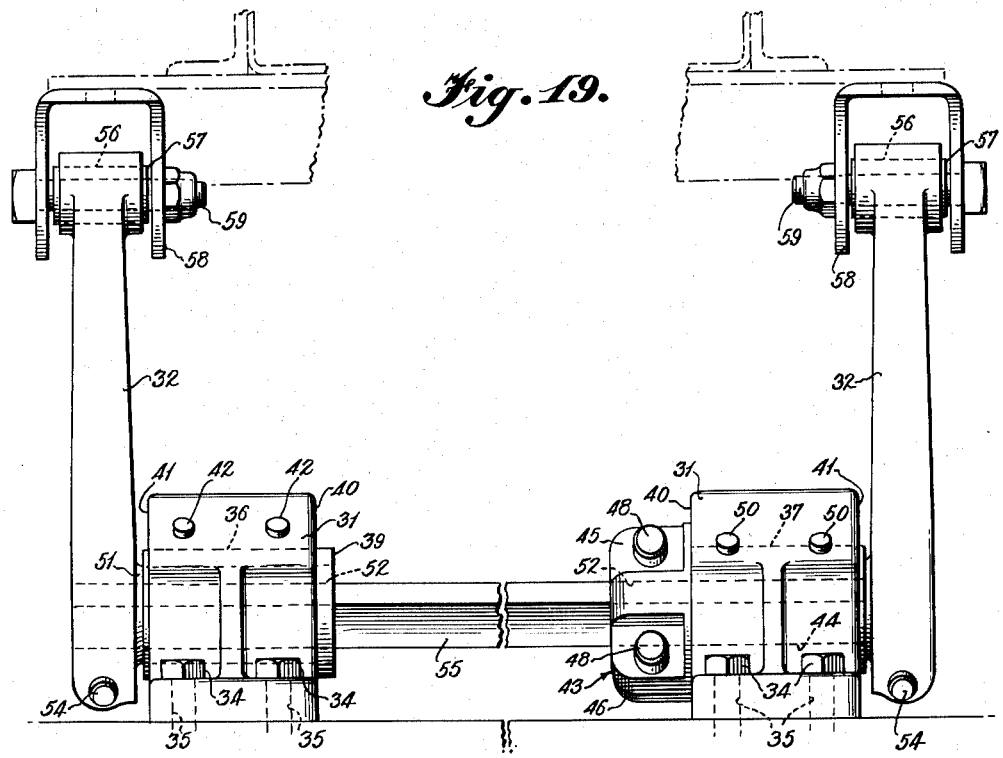
Figure 20:
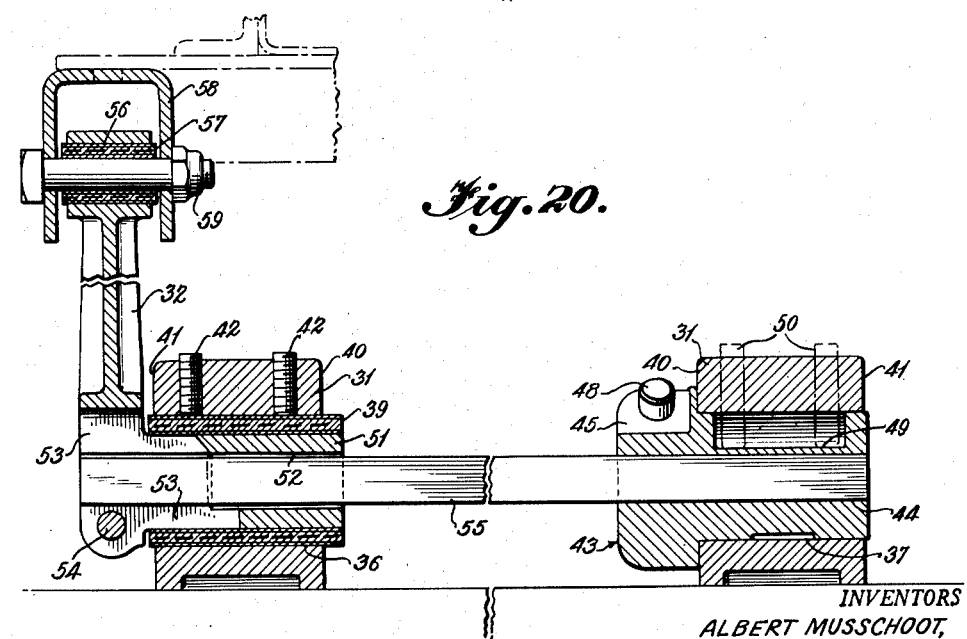

In the accompanying drawings, forming a part of this specification, and in which like characters are employed to designate like parts throughout the same, Figure 1 is a side elevational view of an oscillating conveyor embodying the invention, Figure 2 is an enlarged fragmentary side elevational view, partly in section, of the drive mechanism of the conveyor, Figure 3 is an enlarged top plan and horizontal sectional view taken on line 3—3 of Fig. 2, Figure 4 is an enlarged vertical sectional view taken on line 4—4 of Fig. 2, Figure 5 is a detail plan view partly in section of the drive arm illustrated in Fig. 4, Figure 6 is a sectional view taken on line 6—6 of Fig. 5, Figure 7 is a detail sectional view taken on line 7—7 of Fig. 5, Figure 8 is a detail sectional view taken on line 8—8 of Fig. 5, Figure 9 is a partly sectional and partly broken away plan view of a fragmentary portion of the conveyor trough specifically illustrating the construction of an attachment plate, Figure 10 is a detail vertical sectional view taken on line 10—10 of Fig. 9, Figure 11 is a detail vertical sectional view illustrating a modification in the construction of the conveyor trough, Figure 12 is a detail vertical sectional view illustrating a further modification in the construction of the conveyor trough, Figure 13 is an enlarged sectional view taken on line 13—13 of Fig. 3 showing a fluid coupling device incorporated in the drive mechanism, Figure 14 is a plan view of one supporting assembly for the conveyor of Fig. 1, Figure 15 is a perspective view of one of the bushings illustrated in Fig. 14, Figure 16 is an end elevational view, partly in section, of the supporting assembly illustrated in Fig. 14, Figure 17 is a vertical sectional view taken on line 17—17 of Fig. 14, Figure 18 is a fragmentary vertical sectional view showing the arrangement of the bushing and set screws in an alternate supporting assembly, Figure 19 is a side elevational view of the supporting assembly illustrated in Fig. 14, Figure 20 is a sectional view taken along line 20—20 of Fig. 16, Figure 21 is a plan view of a modified supporting assembly, Figure 22 is a perspective view of one of the bushings illustrated in Fig. 21, Figure 23 is a side elevational view partly in section of the supporting assembly illustrated in Fig. 21, Figure 24 is a vertical sectional view taken on line 24—24 of Fig. 21, Figure 25 is a fragmentary sectional view showing the arrangement of the bushing and set screws in an alternate supporting assembly to that illustrated in Fig. 21, Figure 26 is an end elevational view of the supporting assembly illustrated in Fig. 21, and Figure 27 is a sectional view taken on line 27—27 of Fig. 23.

In the drawings, wherein for the purposes of illustration are shown the preferred embodiments of the invention, and first particularly referring to Figs. 1, 2, 3 and 4, the reference character 28 designates a conveyor base formed of parallel I-beams. A motor base plate 29 and a drive base plate 30 rest upon and are suitably connected to the tops of the I-beams to bridge the space between opposite sides of the base 28. The edges of the plates 29 and 30 between the I-beams are flanged downwardly to strengthen the plates.

A plurality of longitudinally spaced housings 31 are connected to the top of the base 28 for mounting the lower ends of the supporting arms 32. The upper ends of these arms are connected to the oscillative trough 33.

Referring now to Figs. 1, 2 and 14 through 20 for a detail description of the supporting means for the trough 33, the housings 31 are connected to the base 28 by the bolts 34 passing through openings 35. The housings 31 are positioned on the parallel I-beams of the base 28 in transversely alined pairs, or so that each housing on one I-beam is transversely opposite an associated housing on the other I-beam.

Two axially parallel, cylindrical openings 36 and 37 extend through each of the housings 31. The opening 36 of each one of the housings 31 on each of the I-beams is in axial alinement with the opening 37 of the housing that is positioned opposite to it on the other I-beam. Tapped holes 38 extend from the upper surfaces of the housings to the openings 37. The locations of the tapped holes 38 with respect to their associated openings 37 will vary, as illustrated in Figs. 16 and 18, in conformance with requirements to be further explained in a later paragraph.

Each opening 37 loosely receives a cylindrical bushing 43 which is provided with a square opening 44 extending axially therethrough. The inner end portion of the bushing 43 extends beyond the inner face 40 of its housing 31 and is enlarged to form a hub 45. A slot 46 diametrically splits the hub 45 and extends for a short distance into the body of the bushing 43. Opposite halves of the hub 45 are provided with alined openings 47 which are normal to the slot 46 and on both sides of the hub. These openings 47 receive the bolts 48 which are tightened to reduce the cross-sectional area of the opening 44 extending axially through the hub 43.

The cylindrical body of the bushing 43 within the opening 37 in each housing 31 is provided on one side with a plane area 49 which is initially substantially normal to the tapped holes 38. Set screws 50 are threaded into the tapped holes 38 to contact the area 49. Further tightening of the set screws 50 will cause the bushing 43 to rotate in the housing 31 in a clockwise or counter-clockwise direction depending upon the location of the tapped holes 38 relative to the opposite sides of their associated openings, as illustrated in Figs. 16 and 18.

Each opening 36 receives a tightly fitted tubular bushing 39 composed of a central rubber member having a steel lining and backing. Each bushing 39 extends slightly beyond the inner face 40 and the outer face 41 of its housing 31. The bushings 39 are held in place in the housings 31 by the set screws 42.

The lower end portion of each supporting arm 32 is provided with a cylindrical projection 51 extending from one side thereof. A square opening 52 extends axially through the projection 51 and the supporting arm 32. The end portion of the opening 52 in and adjacent to the supporting arm 32 is of slightly smaller dimension than the remainder of the opening. The lower end portion of the arm and its projection 51 are split through the reduced portion of the opening 52 by the cut-out 53. A bolt 54 connects the separated extremities at the lower end portion of the arm 32 so that tightening of the bolt reduces the cross-sectional area of the opening 52.

The cylindrical projection 51 of each supporting arm 32 is fitted into the tubular bushing 39 of its associated housing 31 and extends inwardly through the bushing. The supporting arms 32 are thereby pivotally mounted on the housings 31 with their openings 52 in axial alinement with the similarly formed openings 44 in the cylindrical bushings 43.

Torsion bars 55, square in cross-section, are mounted with their end portions in the alined openings 52 and 44. The bolts 48 and 54 are tightened to clamp the ends of each torsion bar to its associated bushing 43 and supporting arm 32. Each bushing 43, therefore, is connected to a supporting arm 32 through a torsion bar 55.

Figs. 19 and 20 show the upper end portion of each supporting arm 32 as being provided with an opening 56 for mounting a steel-backed and steel-lined resilient tubular bushing 57. Brackets 58 are pivotally connected to the supporting arms 32 by the bolts 59 which extend through the alined openings on each side of the brackets and the tubular bushings 57 which lie between the bracket sides.

Referring now to Figs. 21 through 27 for a detail description of a modified supporting means for the trough 33, it is noted that the housings 31 are identical to those previously fully described in connection with Figs. 14 through 20. The housings 31, therefore, will not be described again, and similar reference characters will be used to designate like parts of the same.

Each opening 36 in the housing 31 of this modification receives a tightly fitted steel-backed and steel-lined resilient tubular bushing 60 which is coextensive with its associated opening. The bushings 60 are held in their proper positions in the openings 36 by the set screws 61.

Each opening 37 loosely receives a cylindrical bushing 62 which is provided with a square opening 63 extending axially through the bushing. Each bushing 62 is coextensive with its associated opening 37. The central portion of the cylindrical, exterior surface of the bushing 62 is of a slightly reduced diameter so that the bearing area between the bushing and the surface of the inside opening 37 is limited to the end portions of the bushing.

The portion of each bushing 62 which is of reduced diameter is cut away on one side to provide a plane area 64 that is initially substantially normal to the tapped holes 38. Set screws 65 are threaded into these holes 38 to contact the area 64. Further tightening of the set screws 65 will cause the bushings 62 to rotate in the housings 31 in a clockwise or a counter-clockwise direction depending upon the location of the tapped holes 38 relative to their associated openings 37, as illustrated in Figs. 23 and 25.

It is noted that the tapped holes 38 are illustrated in Figs. 21 through 28 as being limited to one for each opening 37 while the tapped holes 38, illustrated in Figs. 14 through 20, are shown to be in pairs. It is to be understood that the number of tapped holes 38 does not affect their intended function so long as the length of the bushing with which they are associated can accommodate a plurality of set screws.

The lower end portion of each supporting arm 66 is provided with a cylindrical projection 67 extending from one side thereof. A square opening 68 extends axially through the projection 67 and the supporting arm 66. The end portion of the openings 68 in and adjacent to the supporting arm 66 is of slightly smaller dimensions than the remainder of the opening. The reduced portions of the openings 68 and the openings 63 in the bushings 62 are of identical cross-section.

The cylindrical projection 67 of each supporting arm 66 is fitted into the tubular bushing 60 of its associated housing 31 and extends inwardly through the bushing to the inner face 40 of the housing. The supporting arms 66 are thereby pivotally mounted on the housings 31 with the openings 68 in transverse alinement with the openings 63 in the bushings 62.

Torsion bars 69, square in cross-section, are each mounted with one end portion fitted into the opening 68 and the other end portion fitted into the opening 63 of an oppositely arranged supporting arm 66 and a bushing 62. Each bushing 62 is, therefore, connected to a supporting arm 66 through a torsion bar 69. The frictional fit between the torsion bars 69 and the inner surfaces of the openings 68 and 63 is sufficient to prevent movement of the torsion bars axially of the openings.

The upper end portion of each supporting arm 66 is provided with an opening 70 for mounting a steel-backed and steel-lined resilient bushing 71. Brackets 72 are pivotally connected to the supporting arms 66 by the bolts 73 which extend through the alined openings on each side of the brackets and the tubular bushings 71 which lie between the bracket sides.

As illustrated in Figs. 1 through 4 and 9 through 12, the brackets 58 of each pair of supporting arms, except those mounted adjacent the drive base plate 30, are connected to a transverse attachment plate 74. The brackets 58 of the supporting arms 32 mounted adjacent the drive attachment plate 30 are connected to a transverse drive attachment plate 75.

A plurality of longitudinally arranged channel beams 76 are supported on the several attachment plates 74 and the drive attachment plate 75 in spaced back-to-back relationship, and the associated end portions of adjacent channel beams are connected by tie plates 77. Each tie plate 77 is permanently connected to the web portion of one channel beam and is detachably connected to the web portion of the adjacent channel beam. In other words, the channel beams 76 are arranged to form two substantially continuous side beams extending in parallel relationship along the outer end portions of the attachment plates 74 and the drive attachment plate 75. The channel beams 76 are connected to the attachment plates 74 and drive attachment plate 75 by bolts 78.

A trough-shaped pan 79 is positioned between the backs of the channel beams 76 and is suitably connected thereto by the bolts 80. The pan 79 rests upon but is not connected to the attachment plates 74 and the drive attachment plate 75. This pan is formed of any desired number of alined sections and each section is provided at its ends with downwardly flanged portions 81 for connection to the next adjacent sections by the bolts 82.

In order to provide troughs 33 of different widths, the distance between the parallel channel beams 76 may be varied, as illustrated in Figs. 9 through 12, and the width of the trough-shaped pan 79 then should be varied in accordance with the distance between the channel beams.

Figs. 9 and 10 illustrate an arrangement wherein the channels 76 are connected to the attachment plates 74 and the drive attachment plate 75 directly above the point of connection of the brackets 58. Fig. 11 illustrates an arrangement wherein the attachment plates 74 and the drive attachment plate 75 will be extended beyond the brackets 58, and the channels 76 will be connected to the attachment and the drive attachment plates outwardly of the brackets. Fig. 12 illustrates an arrangement wherein the channels 76 are connected to the attachment and drive attachment plates inwardly of the brackets 58. It is noted that the variations in trough width provided by the arrangements illustrated in Figs. 9 through 12 require no modification of the supporting arms 32 with their attached brackets 58 or of the attachment or drive attachment plates 74 and 75. The arrangement illustrated in Fig. 11, providing for greater trough width, requires an extension in the lengths of the attachment and drive attachment plates 74 and 75 but does not change the positions of the brackets 58 and supporting arms 32.

Assuming now that the supporting means are assembled as described above and that the supporting arms 32 are connected to the oscillative trough 33, the torsion bars 55 will be arranged and conditioned to provide the desired reactor effect with respect to the oscillations of the trough as follows:

As the trough 33 is oscillated between its extreme forward and rearward limits, the inertia forces built up in the trough are reversed each time the direction of travel of the trough is reversed. These inertia forces must be overcome by other forces applied to the trough in opposition to the inertia forces. When a force is applied to the trough in resisting or opposing the inertia forces and such a force is inversely proportional to the inertia forces, the result is called a reactor effect. In other words, the reactor forces provided by the torsion bars 55 are opposed to the displacement of the trough 33 from its neutral position, and are increased as the displacement increases until they reach a maximum at the forward or rearward limit of each oscillation. If the forces produced by the torsion bars of a given assembly are in a forward direction only, there is provided a forward reacting assembly. If the forces are in a rearward direction only, a rearward reacting assembly is provided.

The reaction forces provided by the torsion bars 55 result from the twisting of the bars by the pivotal movement of the supporting arms 32 when the trough 33 is oscillated. This twisting of the torsion bars 55 sets up stresses in the bars in a direction to resist the twisting, so that, to prevent stress reversals in the bars, an initial twist is imparted to the bars which is never completely relieved as the trough 33 is oscillated. The direction of the initial twist in the torsion bars 55 determines the forward or rearward direction of the reactor effect of the bars. This is due to the fact that only movement of the supporting arms 32 in a direction to increase the twist in the bars 55 will produce an effective reacting force.

The direction of the initial twist in the forward and rearward reacting assemblies results from the location of the set screws 50 in the alternate arrangements illustrated in Figs. 16 and 18. The set screws 50 in Fig. 16 are positioned for rearward reaction and the set screws 50 in Fig. 18 are positioned for forward reaction.

To adjust for forward reaction the oscillative trough 33 is moved to the extreme forward position, and the set screws 50, positioned for forward reaction, are tightened to exert pressure on the surfaces 49 of the bushings 43. This pressure causes the bushings 43 to move in their associated openings 37 until twisting of the torsion bars 55 is sufficient to prevent a reversal of the stresses thereon during oscillation of the trough 33.

Proper tightening of the set screws 50 for the several torsion bars 55 causes the desired torsional stresses to be established in the torsion bars at which point the resultant forward and rearward reacting forces are balanced one against the other, and the oscillative trough 33 is biased into its desired neutral position. The neutral or normal position of the supporting arms 32 will usually lie at an angle of approximately 30° from the vertical, but may vary between 25° and 35°, more or less, if the circumstances require such a condition.

The arrangement and adjustment of the modified supporting structure illustrated in Figs. 21 through 27 is identical to that above described and will not be repeated.

Referring now to Figs. 1 through 8 and 13 for a detail description of the driving mechanism for the oscillative trough 33, bearing housings 83 are mounted on the drive base plate 30 to receive the self-alining roller bearings 84 which in turn support the driven shaft 85 near each of its end portions. These end portions extend beyond the outer sides of the housings 83 for receiving the driven sheave 86 on one end portion and the flywheel 87 on the other end portion. The outer sides of the housings are closed by the seal plates 88. The inner opening of each of the housings 83 is closed by a seal plate 89.

It is noted that the driven sheave 86 and the flywheel 87 are keyed to their respective end portions of the shaft 85 and that plates 90 are connected to the ends of the shaft 85 to prevent accidental loosening or disconnection of either of these elements.

A limited amount of adjustment of the transverse alinement of the bearing housings 83 is provided by the lugs 91 and cap screws 92 associated with the drive base plates 30. This adjustment is made possible by the clearance that is provided for the bolts 93 which mount the bearing housings 83 on the base plate 30.

Roller bearings 94 are mounted on the shouldered portions 95 at the ends of the eccentric middle portion of the driven shaft 85. A drive arm 96 is mounted on the eccentric middle portion of the driven shaft 85 by the tubular casing 97 of the arm which encloses the middle portion of the shaft and has its enlarged ends 97a fitted over the outer races of the roller bearings 94. The enlarged ends 97a of the casing 97 are closed outwardly of the bearings 94 by the seal plates 98.

As is illustrated in Figs. 5 through 8, each side of the casing 97 of the driving arm is suitably connected to a side flange 99. The side flanges 99 are in turn connected by a web plate 100 extending therebetween. At the outer end portion of the driving arm 96 the side flanges 99 extend beyond the web plate 100 and are each provided with a pair of split clamps 101 welded to opposite sides of the flange and surrounding a transverse opening formed in the latter. The side flanges 99 also are split radially in alinement with the splits in the clamps 101 and bolts 102 are passed through holes formed in the spaced ends of the clamps so that tightening of the bolts reduces the cross-sectional area of the openings formed in the clamps 101 and the ends of the flanges 99.

A split bushing 103, having oil grooves 104 therein, is inserted into each opening through the outer end portion of the arm 96. The splits in the bushings 103 are radially alined with the splits in the clamps 101 and flanges 99. Set screws 105 are employed to prevent the bushings from turning relative to the clamps. The outer clamp 101 on each side of the driving arm 96 is provided with a plurality of tapped holes 106 for receiving the cap screws 107 to fasten a plate 108 across the opening through the clamp.

Figs. 2, 3 and 4 disclosed a pair of parallel plates 109 rigidly connected to the bottom surface of the drive attachment plate 75. A pair of angle irons 110 are connected to the transverse edges of the drive attachment plate 75 and depend therefrom for connection to the ends of the parallel plates 109. Each of the plates 109 is provided with a clamping element 111 and attaching bolts 112 for fastening a connecting pin 113 to the bottom of the drive attachment plate 75. The ends of the connecting pin 113 extend outwardly from the plates 109 and the clamping elements 111, and are received in the bushings 103 at the outer end portions of the driving arm 96. The bushings 103 are contracted around the end portions of the connecting pin 113 by tightening the bolts 102 so that movement between the pin and the driving arm is limited to a pivotal fit.

Proper positioning of the connecting pin relative to the shaft 85 and its drive arm 96 is provided by the lugs 114 and the cap screws 115 mounted therein. The lugs 114 are suitably fastened to the bottoms of the channel beams 76 and clearance is provided for the bolts 78 which connect the channel beams to the drive attachment plate. Adjustment of the cap screws 115, therefore, will move the drive attachment plate relative to the channel beams 76.

Figs. 1, 2 and 3 show a unitary drive, consisting of a motor 116 and a traction type fluid coupling unit 117, suitably adjustably mounted on the motor base plate 29. Fig. 13 shows the motor shaft 118 rigidly connected to the casing 119 of the fluid coupling. The casing consists of a pair of impellers 120 in spaced face-to-face relationship. A pair of runners 121 are connected back-to-back on hubs 122 which are keyed to the driven shaft 123 and are positioned between the impellers 120 so that a runner faces each impeller.

Two working fluid circuits are thereby formed, one between each of the opposing faces of a runner 121 and an impeller 120. Each working circuit consists of a series of impeller vanes 124 connected by an annular center ring 125, and a series of oppositely arranged runner vanes 126 connected by a center ring 127. The center rings 125 and 127 cooperate to form a ring core which is surrounded by the passageways formed by the opposing spaces between the vanes 124 and 126.

When the motor 116 is operating to rotate the impellers 120, the fluid in the unit is discharged by centrifugal force from the outer ends of the passages between the impeller vanes 124 into the outer ends of the passages between the runner vanes 126 and is returned by the latter to the inner ends of the passages between the impeller vanes 124. The fluid, therefore, is continuously circulated about the ring core and reacts against the runner vanes 126 to impart rotary motion to the runners 121 whereby the shaft 123 is rotated. The axial thrust of each working circuit is balanced against the other so that the total end thrust of the unit is substantially eliminated.

A drive sheave 128 is keyed to the shaft 123, and belts 129 drivingly connect the drive sheave to the driven sheave 86. Rotation of the shaft 123, therefore, causes rotation of the sheaves 128 and 86 and the driven shaft 85.

When the shaft 85 is rotated about the axis of its journaled end portions, the eccentrically formed portions 95 of the shaft are caused to travel in a circular path about the axis of rotation. This movement of the eccentric portions of the shaft is transmitted through the bearings 94 to the driving arm 96 to impart oscillatory motion to the trough 33.

The fluid coupling unit 117 functions to gradually apply the starting torque load to the motor 116 by permitting slippage between the impellers 120 and the runners 121 during starting of the device. This gradual application of the maximum starting torque reduces the power requirements for the motor 116, and thereby permits the use of a smaller horsepower motor. The fluid coupling unit 117 further acts to prevent the transmission of shock forces from the oscillating and rotating parts through the transmission mechanism and into the motor 116.

The flywheel 87 functions to reduce any fluctuations in the speed of rotation of the driven shaft 85 and to substantially counterbalance the torsional forces transmitted to the driven shaft by the driving arm 96.

The supporting assemblies are adjusted as to their reactor effect to provide for the proper ratio of forward and rearward reacting assemblies so that the reacting forces will substantially balance the inertia forces and their gravity components when the trough 33 is oscillated.

It is to be understood that the forms of the invention, herewith shown and described, are to be taken as preferred examples of the same, and that various changes in the shape, size and arrangement of parts may be resorted to without departing from the spirit of the invention or the scope of the subjoined claims.

Having thus described the invention, we claim:

1. In an oscillating conveyor, a conveying body, supporting means pivotally connected to said conveying body, base means, resilient means connecting said supporting means to said base means, said resilient means urging said body into a balanced position, a rotatable eccentric shaft mounted transversely of said body, driving means pivotally connected to the eccentric portion of said shaft, a prime mover, and means, including a fluid coupling, between said prime mover and said shaft for transmitting rotation to said shaft to impart reciprocating motion to said driving means to oscillate said body.

2. In an oscillating conveyor, a conveying body, supporting means pivotally connected to said conveying body, base means, resilient means connecting said supporting means to said base means, means for stressing said resilient means to create opposing forces in said supporting means and urge said body into a balanced position, a rotatable eccentric shaft mounted beneath said body transversely thereof, driving means pivotally connected to said body and rotatably connected to the eccentric portion of said shaft, a prime mover, and transmission means, including a fluid coupling, between said prime mover and said shaft to rotate said shaft and impart reciprocating motion to said driving means to oscillate said body.

3. In an oscillating conveyor, a conveying body, a plurality of pairs of associated supporting arms pivotally connected to said conveying body, base means, resilient means independently connecting each of said supporting arms to said base means, means for stressing said resilient means to create balanced opposing forces between said pairs of supporting arms, said opposing forces acting to urge said body into a balanced position, a rotatable eccentric shaft mounted beneath said body transversely thereof, driving means pivotally connected to said body and rotatably connected to the eccentric portion of said shaft, a prime mover, and transmission means, including a fluid coupling, between said prime mover and said shaft to rotate said shaft and impart reciprocating motion to the driving means to oscillate said body.

4. In an oscillating conveyor, a conveying body, a plurality of supporting means pivotally connected to said conveying body, base means, a plurality of torsion bars each having one end portion fastened to said base means and the other end portion fastened to a supporting means, means for applying a twist to each of said torsion bars to create balanced opposing forces in said supporting means and urge said body into a balanced position, a rotatable eccentric shaft mounted beneath said body transversely thereof, driving means pivotally connected to said body and rotatably connected to the eccentric portion of said shaft, a prime mover, and transmission means, including a fluid coupling, between said prime mover and said shaft to rotate said shaft and impart reciprocating motion to the driving means to oscillate said body.

5. In an oscillating conveyor, a conveying body, a plurality of pairs of supporting arms pivotally connected to said conveying body, base means, a plurality of torsion bars each having one end portion fastened to said base means and the other end portion fastened to an associated supporting arm, means for initially twisting each of said torsion bars to create evenly balanced opposing forces between said pairs of supporting arms, said opposing forces acting to urge said body into a balanced position, a rotatable shaft, having an eccentric middle portion, mounted transversely of said body, a drive arm pivotally connected to said body and rotatably connected to each end of the eccentric middle portion of said shaft, a prime mover, and transmission means, including a fluid coupling, between said prime mover and said shaft to rotate said shaft and impart reciprocating motion to said drive arm to oscillate said body.

6. In an oscillating conveyor, a conveying body, a plurality of pairs of associated supporting arms each pivotally connected to said oscillative body, a plurality of housings arranged in two longitudinal rows which each housing of one row arranged transversely opposite a housing of the other row, each of said housings including rotatable bushing means and supporting means with the bushing means of the housings in each row being in axial alinement with the supporting means of the housings in the other row, the lower end portions of said supporting arms each being pivotally mounted in said supporting means, a plurality of torsion bars each having one end portion mounted in said bushing means for rotation therewith and the other end portion mounted in the lower end portion of the oppositely arranged supporting arm for rotation therewith, means for separately rotating each of said bushings relative to their supporting arms to twist said torsion bars in the proper directions to create evenly balanced opposing forces between said pairs of supporting arms, a rotatable eccentric shaft mounted transversely to said body, driving means pivotally connected to said body and rotatably connected to the eccentric portion of said shaft, a prime mover, and transmission means, including a fluid coupling, between said prime mover and said shaft to rotate said shaft and impart reciprocating to the driving means to oscillate said body.

7. In an oscillating conveyor, housing means, a bushing rotatably mounted on said housing means, an arm rotatably supported by said housing means, a torsion bar fastened at its opposite end portions to said bushing and said arm to resiliently connect the same, and means for turning said bushing relative to said arm to twist said torsion bar.

8. In an oscillating conveyor, housing means, a substantially cylindrical bushing, having a centrally located opening therethrough, rotatably mounted in said housing means, an arm, having an opening through the lower end portion thereof in axial alinement with the opening in said bushing, rotatably supported by said housing means, a torsion bar having its opposite end portions positioned in the openings in said arm and said bushing for rotation with the same, and means for turning said bushing relative to said arm to twist said torsion bar.

9. In an oscillating conveyor, housing means, a substantially cylindrical bushing rotatably mounted in said housing means, said bushing having a plane area near the middle portion of its outer surface and a centrally located opening, an arm, having a substantially cylindrical lower end portion, rotatably supported by said housing means, said lower end portion having an opening therethrough in axial alinement with the opening in said bushing, a torsion bar having its opposite end portions positioned in the openings in said arm and said bushing for rotation with the same, and means for applying a force to one side of said plane area to turn said bushing relative to said arm and twist said torsion bar.

10. In an oscillating conveyor, housing means, a bushing, having a centrally located opening therethrough, rotatably mounted in said housing means, an arm arranged with its ends at different elevations, having an opening in the lower end portion thereof in axial alinement with the opening in said bushing, rotatably supported by said housing means, a torsion bar having its opposite end portions positioned in the openings in said arm and said bushing, means for reducing the cross-sectional area at one end portion of the bushing opening to clamp the torsion bar in the bushing, means for reducing the cross-sectional area of the opening in the arm to clamp the torsion bar to the arm, and means for turning the bushing relative to the arm to twist said torsion bar.

11. In an oscillating conveyor, housing means, a bushing having a centrally located opening therethrough, rotatably mounted in said housing means, an arm arranged with its ends at different elevations, having an opening in the lower end portion thereof in axial alinement with the opening in said bushing, rotatably supported by said housing means, a torsion bar having its opposite end portions axially slidably positioned in the openings in said arm and said bushing and held against rotation relative thereto, and means for turning the bushing relative to the arm to twist said torsion bar.

12. In an oscillating conveyor, a conveying body, and means for supporting said body, said means comprising a plurality of supporting arms each pivotally connected at its upper end portion to said body, base means, resilient means connecting said base means and the lower end portion of each supporting arm, and means for stressing said resilient means to impart a turning moment to said supporting arms, the turning moment in certain of said supporting arms being equal to the oppositely imposed turning moment of the other supporting arms to urge said body into a balanced position.

13. In an oscillating conveyor, a conveying body, and means for supporting said body, said means comprising a plurality of pairs of supporting arms pivotally connected at their upper end portions to said body, base means, a plurality of bushings mounted in said base means, a plurality of torsion bars each having one end portion clamped in a bushing and the other end portion clamped to the lower end portion of an associated supporting arm, and means for separately rotating each of said bushings to twist its torsion bar, the twists in said torsion bars being in directions to create balanced opposing forces between said pairs of supporting arms to urge said body into a balanced position.

14. In an oscillating conveyor, a conveying body, and means for supporting said body, said means comprising a plurality of pairs of supporting arms pivotally connected at their upper end portions to said body and each having a transverse opening through the lower end portion thereof, base means, a plurality of bushings mounted in said base means having openings in axial alinement with the opening in the lower end portions of said arms, a plurality of torsion bars having their opposite end portions axially slidably positioned in the alined openings in said bushings and said supporting arms and held against rotation relative thereto, means for separately rotating certain of said bushings to twist their torsion bars in a clockwise direction, and means for separately rotating the remaining bushings to twist their torsion bars in a counterclockwise direction, the directions and degrees of twist in said torsion bars being such as to create balanced opposing forces between said pairs of supporting arms to urge said body into a balanced position.

15. In an oscillating conveyor, a conveying body, base means underlying said body, means pivotally connected to the base means and to said conveying body for supporting the latter for oscillative movement, resilient reactor means connected to said pivotal supporting means, means for connecting said reactor means to said base, means for adjusting the position of said connecting means relative to said base to urge the conveying body into a balanced position and substantially balance the inertia forces developed by the oscillations of the conveying body, a rotatable eccentric shaft mounted on said base means transversely of said body, a drive arm pivotally connected to said body and rotatably connected to the eccentric portion of said shaft, a flywheel rigidly fastened to one end portion of the eccentric shaft, a prime mover, and means connecting the prime mover and the remaining end portion of the eccentric shaft for rotating the shaft to impart reciprocating motion to the drive arm to oscillate the conveying body.

16. In an oscillating conveyor, a conveying body, base means underlying said body, means pivotally connected to the base means and to said conveying body for supporting the latter for oscillative movement, resilient reactor means connected to said pivotal supporting means, means for connecting said reactor means to said base, means for adjusting the position of said connecting means relative to said base to initially stress said resilient reactor means and to create opposing forces acting on said pivotal supporting means for urging said conveying body into a balanced position and for substantially balancing the inertia forces developed by the oscillations of the conveying body, a rotatable eccentric shaft mounted on said base means transversely of said body, a drive arm pivotally connected to said body and rotatably connected to the eccentric portion of said shaft, a flywheel rigidly fastened to one end portion of the eccentric shaft, and driving means for rotating the eccentric shaft to impart reciprocating motion to the drive arm to oscillate the conveying body.

17. In an oscillating conveyor, a conveying body, base means underlying said body, a plurality of arms pivotally connected in spaced relation to the base means and to each side of said conveying body for supporting the latter for oscillative movement, separate resilient reactor means connected to each of said arms, means for connecting said reactor means to said base, means for adjusting the position of said connecting means relative to said base to initially stress said separate resilient reactor means, some in one direction and the remainder in the opposite direction, and to create opposing forces acting on said arms for urging said conveying body into a balanced position and for substantially balancing the inertia forces developed by the oscillations of the conveying body, a rotatable eccentric shaft mounted on said base means transversely of said body, a drive arm pivotally connected to said body and rotatably connected to the eccentric portion of said shaft, a prime mover, and means connecting the prime mover and the eccentric shaft for rotating the shaft to impart reciprocating motion to the drive arm to oscillate the conveying body.

18. In an oscillating conveyor, a conveying body, base means underlying said body, a plurality of arms pivotally connected in spaced relation to the base means and to each side of said conveying body for supporting the latter for oscillative movement, a separate reactor bar connected to each of said arms at one of its end portions and to said base means at its other end portion, means for applying and maintaining an initial twist in each of said reactor bars, some in one direction and the remainder in the opposite direction, to create opposing forces acting on said arms for urging said conveying body into a balanced position and for substantially balancing the inertia forces developed by the oscillations of the conveying body, a rotatable eccentric shaft mounted on said base means transversely of said body, a drive arm pivotally connected to said body and rotatably connected to the eccentric portion of said shaft, a prime mover, and means connecting the prime mover and the eccentric shaft for rotating the shaft to impart reciprocating motion to the drive arm to oscillate the conveying body.

19. In an oscillating conveyor, a conveying body, and means for supporting said body for oscillative movement, said means comprising a base underlying said conveying body, a plurality of arms pivotally connected in spaced relation to the base and to each side of said conveying body, a separate reactor bar connected to each of said arms at one of its end portions and to said base at its other end portion, and means for applying and maintaining an initial twist in each of said reactor bars, some in one direction and the remainder in the opposite direction, to impart opposed turning movements to said supporting arms for substantially balancing the inertia forces developed when said conveying body is oscillated.

20. In an oscillating conveyor, a conveying body, a base underlying said body, means pivotally connected to said base and to said body for supporting the latter for oscillative movement, resilient reactor means connected to said pivotal supporting means, means for connecting said reactor means to said base, and means for adjusting the position of said connection means relative to said base to initially stress said resilient reactor means and to create opposing forces acting on said pivotal supporting means for urging said conveying body into a balanced position and for substantially balancing the inertia forces developed when said conveying body is oscillated.

ALBERT MUSSCHOOT.
RICHARD F. BERGMANN.
CHARLES M. YOUNG, Jr.

References Cited in the file of this patent

UNITED STATES PATENTS

| Number | Name | Date |
|---|---|---|
| 1,622,305 | Bland | Mar. 29, 1927 |
| 1,770,644 | Hartog | July 15, 1930 |
| 1,804,578 | Walter | May 12, 1931 |
| 1,819,784 | McKone | Aug. 18, 1931 |
| 1,986,102 | Cole | Jan. 1, 1935 |
| 2,068,592 | Bergmann | Jan. 19, 1937 |
| 2,230,420 | Wilber | Feb. 4, 1941 |
| 2,325,248 | Johnstone | July 27, 1943 |
| 2,337,174 | Bebinger | Dec. 21, 1943 |